Feb. 7, 1950     A. J. VAN HOORN     2,496,901
METHOD AND COMPOSITION FOR
COATING CATHODE-RAY TUBES
Filed July 14, 1944
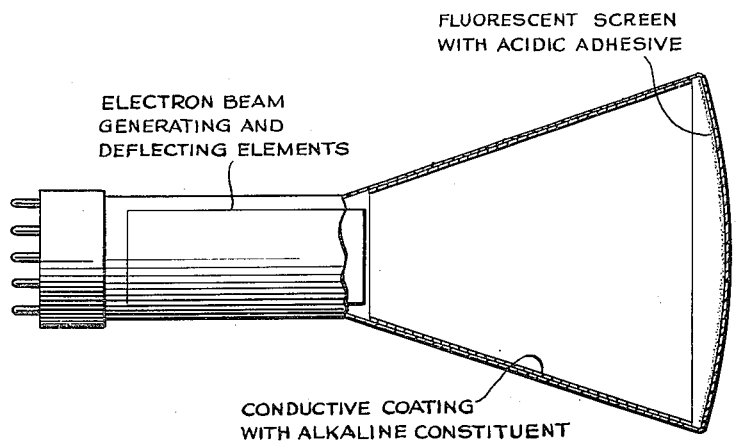
ADRIAAN JACOBUS VAN HOORN
INVENTOR.
BY
ATTORNEY.

UNITED STATES PATENT OFFICE

2,496,901

METHOD AND COMPOSITION FOR COATING CATHODE-RAY TUBES

Adriaan Jacobus van Hoorn, London, England, assignor to The Hartford National Bank and Trust Company, Hartford, Conn., as trustee Application July 14, 1944, Serial No. 545,022
In Great Britain July 6, 1943

3 Claims. (Cl. 117—33.5)

In the manufacture of cathode-ray tubes, more particularly high-voltage tubes, it is customary to provide the wall of the tube between the screen and the electrode system with a conducting coating serving primarily to collect stray electrons. This coating, which may consist of graphite or other conducting material, is usually applied in the form of a suspension of the conducting particles admixed with an organic binder such as agar-agar, gum tragacanth or Irish moss. Stabilisers such as ammonia, and preservatives may be added to the suspension. After the coating has been applied, it is baked with the result that the binder is driven off and a firmly adhering conducting coating results. Thereafter the screen is formed by causing the fluorescent material to adhere to the appropriate part of the wall of the tube. Various methods have been adopted, including those in which an acidic adhesive is first applied usually in dilute solution and thereafter the screen material in powder-form is applied to the adhesive-coated surface. Adhesives which have been found suitable for the purpose are phosphoric acid, acid phosphates, boracic acid and acid borates. In tubes having a graphite or like coating as mentioned above, it is substantially impossible to prevent the acid adhesive from coming into contact with the graphite coating, with the result that the powder for the screen also adheres to the graphite coating. In view of the nature of the surface of the graphite coating, it is difficult to remove this adhering powder, which however may come off at any inconvenient moment after the tube has been pumped. The object of the present invention is to prevent this adherence of powder to the graphite or like layer during the laying-on of the screen.

According to the present invention, with this object in view, an alkaline material capable of neutralising the acid in the adhesive is incorporated in the graphite or like layer. The choice of alkaline material is restricted by the fact that the presence of the material itself or the product of reaction with the acid must not be detrimental in any way to the cathode-ray tube, nor must it produce a gel with the graphite suspension or otherwise interfere with the formation of the graphite coating. Stable alkaline oxides are particularly suitable, more especially magnesium oxide and aluminium oxide. Oxides such as calcium oxide can also be used. The use of magnesium oxide or aluminium oxide is to be recommended as they both exert a getter action in the tube, and we prefer to use magnesium oxide.

The amount of acid to be neutralised is in any case small, so that correspondingly small quantities of alkaline material are required. It is found that neutralisation of the acid effectively prevents the subsequent adherence of the luminescent material. No advantage is derived from the use of alkaline material in considerable excess, and it will be apparent that the amount must not be increased to such an extent as to detract from the proper functioning of the graphite or like conducting layer.

Preferably a suspension is made containing the finely divided graphite (or other conducting material) and the organic binder together with ammonia as stabiliser, and a separate suspension is made containing the alkaline material. For use, the two suspensions are mixed and diluted to the appropriate concentration. It is found that the use of magnesium oxide as the alkaline material reduces the amount of organic binder required to cause the proper adherence of the conducting coating.

When manufacturing cathode-ray tubes in accordance with the present invention, it is preferred to use as acidic adhesive for the luminescent material, a dilute solution of phosphoric acid in acetone. It is naturally necessary to adopt the usual precautions to obtain a perfectly clean glass surface and the surface to receive the screen may be frosted before the screen is laid-on.

A cathode-ray tube made in accordance with the present invention is shown in the attached drawing forming part of the specification.

The following is a typical example of the process according to the invention:

A graphite suspension is produced by mixing 45 gms. agar or gum tragacanth
425 gms. Dixon's graphite cement
1000 c. c. distilled water
10 c. c. ammonia (strong)

in a ball mill which has a capacity of 5 litres, contains 3 kgs. of porcelain balls and is driven at 32 revolutions per minute for 96 hours. The Dixon's cement referred to in this process is one of several graphite materials well known to the art and consists essentially of:

45 parts by weight of graphite
50 parts by weight of water
5 parts by weight of volatile solvent such as methyl alcohol, ethyl alcohol
1½ parts by weight of organic dispersing agent such as di-glycol oleate, di-glycol laurate or di-glycol stearate.

A magnesium oxide suspension is produced by mixing 500 gms. magnesium oxide
    5000 c. c. water in a ball mill which has a capacity of 15 litres, contains 3 kgs. of porcelain balls and is driven at 52 revolutions per minute for 14 hours.

The coating composition is produced by mixing 13.5 kgs. of the graphite suspension
    2000 c. c. of the magnesium oxide suspension
    100 c. c. ammonia in a ball mill which has a capacity of 15 litres, contains 3 kgs. of porcelain balls and is driven at 52 revolutions per minute for 14 hours. Thus a coating composition is formed containing approximately:

2 kg. of graphite
    13 kg. of water
    0.4 kg. of water soluble organic binder
    0.1 kg. of ammonia
    0.2 kg. of magnesium oxide Calcium oxide may be appropriately substituted for the magnesium oxide as noted hereinbefore.

The conducting coating is applied to the wall of the bulb of the cathode ray tube in any convenient manner, e. g. by means of a brush, and thereafter hot air is passed into the bulb to drive off the water, the bulb is then baked at approximately 400° C. for 2 hours.

The screen part of the bulb is then washed with acetone to remove all dust particles. Then the phosphoric acid binder is applied by rinsing the whole surface with a 1% solution of phosphoric acid in acetone, the acetone being dried off to leave the phosphoric acid. The fluorescent material is blown on top of the phosphoric acid layer to which it adheres. No adhesion occurs at the graphite coated portion of the bulb.

To fix the fluorescent material permanently, the bulb is baked at 200° C. for 2 hours, whereafter it is ready for sealing.

I claim:

1. In the manufacture of cathode ray tubes, the method comprising the steps of applying a coating to the inner side walls of the tube with a graphite-water soluble organic binder material having an alkaline ingredient from the group consisting of magnesium oxide, aluminum oxide and calcium oxide; making the tube to volatilize the water soluble organic binder; then applying a coating of adhesive material from the groups consisting essentially of acid phosphates and acid borates to the adjacent end wall of the tube; and then applying fluorescent screen material in powder form to the adhesive coat; and baking to fix the fluorescent material coating, the alkaline ingredient in the side wall coating being effective to neutralize any of the adhesive material that might fall on said graphite layer, and thus acting to prevent the fluorescent powder from adhering to the graphite coating due to the lack of acidic binder.

2. In the manufacture of cathode ray tubes in which a graphite coating composition is applied and baked onto the inner side wall of the tube, and then a layer of fluorescent powder material on an adhesive base from the groups consisting essentially of acid phosphates and acid borates is applied on the adjacent front end wall, the method of preventing any of the adhesive that falls on the graphite coating, from receiving and binding some of the fluorescent powder material to the graphite coating, which consists in including in the graphite coating composition an alkaline material from the group consisting of magnesium oxide, aluminum oxide and calcium oxide, whereby any adhesive material that may fall onto the former graphite coating is neutralized to prevent any adherence of the fluorescent powder onto the graphitic coating.

3. A coating composition for use in carbon coating a cathode ray tube said composition consisting essentially of an aqueous suspension of graphite particles having about 2 kilograms of graphite present in about 13 kg. of water; a water soluble organic binder in the amount of about 0.4 kg.; ammonia in the amount of about 0.1 kg.; and an alkaline material selected from the group consisting of magnesium oxide and calcium oxide, present in the amount of about .2 kg.

ADRIAAN JACOBUS van HOORN.

REFERENCES CITED

The following references are of record in the file of this patent:

UNITED STATES PATENTS

| Number | Name | Date |
|---|---|---|
| 1,976,920 | Christiansen | Oct. 16, 1934 |
| 2,087,006 | Riggs | July 13, 1937 |
| 2,124,331 | Bockmuhl | July 19, 1938 |
| 2,162,391 | Schwartz et al. | June 13, 1939 |
| 2,166,868 | Jones | July 18, 1939 |
| 2,223,924 | Stephan | Dec. 3, 1940 |
| 2,232,083 | Strohfeldt | Feb. 18, 1941 |
| 2,266,595 | Fraenckel | Dec. 16, 1941 |
| 2,280,135 | Ward | Apr. 21, 1942 |

FOREIGN PATENTS

| Number | Country | Date |
|---|---|---|
| 336,500 | Germany | May 4, 1921 |
| 476,797 | Great Britain | Dec. 15, 1937 |
| 519,854 | Great Britain | Oct. 3, 1939 |